UNITED STATES PATENT OFFICE.

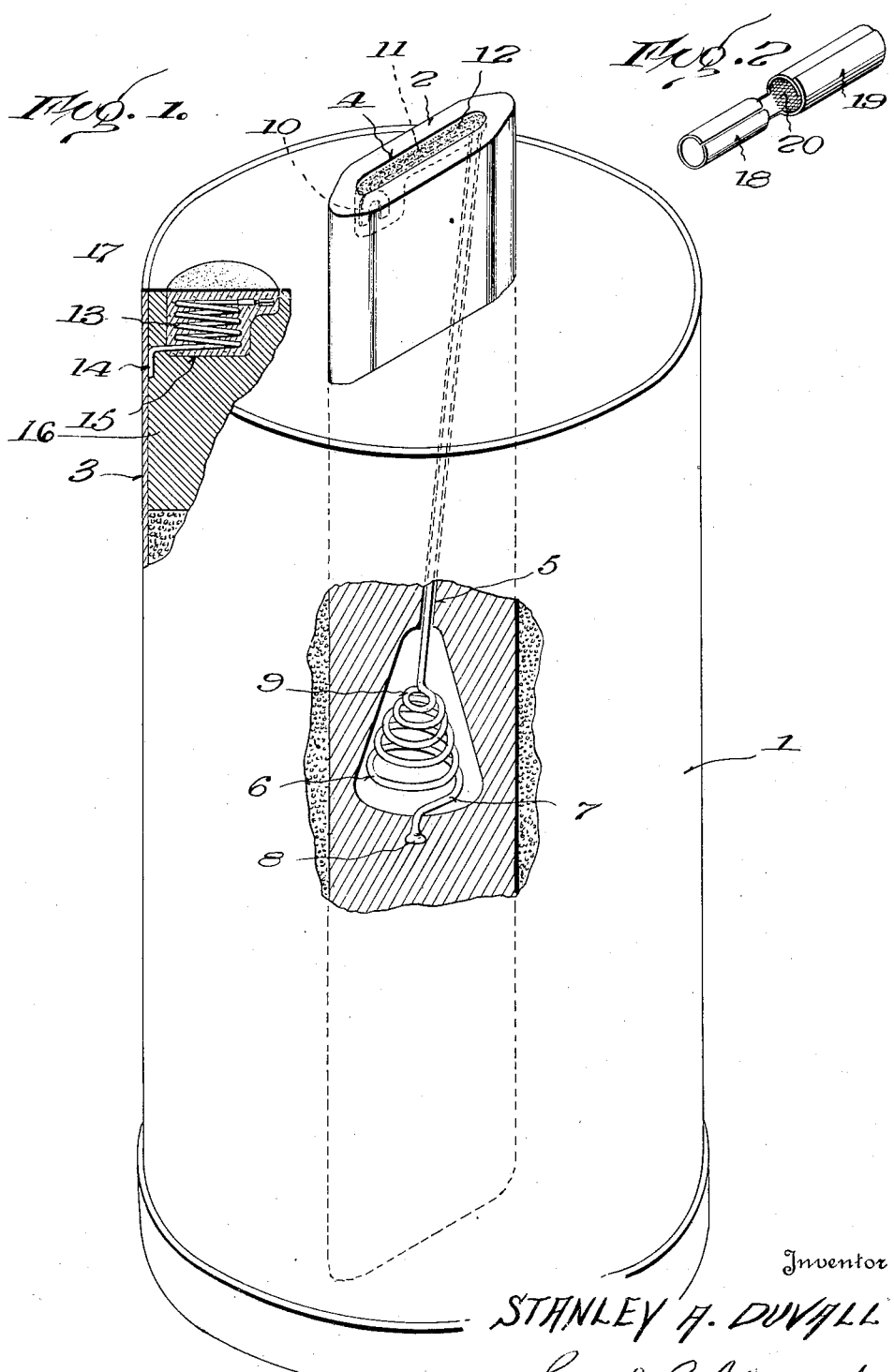

STANLEY A. DUVALL, OF CHICAGO, ILLINOIS.

BATTERY-TERMINAL.

1,299,149. Specification of Letters Patent. Patented Apr. 1, 1919.

Application filed September 21, 1918. Serial No. 255,073.

*To all whom it may concern:*

Be it known that I, STANLEY A. DUVALL, a citizen of the United States, residing at Chicago, in the county of Cook and State of Illinois, have invented certain new and useful Improvements in Battery-Terminals, of which the following is a specification, reference being had therein to the accompanying drawing.

My invention relates to battery terminal extensions or conductors, and more particularly to an improved form of flexible conductor for use with portable primary batteries such as the standard dry cell or dry battery.

An object of my invention is to provide a dry battery carrying a flexible conductor for connecting an element of the battery with another battery or other device and arranged to be carried within the surfaces defining the battery proper so as to leave no projecting parts additional to those of the battery proper and at the same time be capable of being extended or withdrawn without severing its electrical connection with the battery by which it is carried.

Another object of the invention is to provide a combined insulating and sealing means for a battery connector to prevent the same from coming into electrical contact with other objects of conducting material during storage or shipment.

Various other objects of my invention will be apparent upon a perusal of the accompanying specification.

My invention is illustrated in the accompanying drawings in which—

Figure 1 is a perspective view of my device with portions broken away to show the interior structure and arrangement.

Fig. 2 is a detailed perspective view of a form of electrical coupling which may be carried by the free end of the flexible conductor or connector.

Referring to the drawings in detail, 1 indicates the battery generally which may be of any standard type of dry cell having the usual carbon element 2 in the form of a central core and a zinc element 3 in the form of a casing or container. In applying my invention to this type of battery, I provide a recess 4 in the upper end of the carbon element 2, which recess is connected by a duct 5 with a connector chamber 6 formed in the interior of the carbon element. One end of a flexible conductor 7 is fixed to and in electrical contact with the carbon element within the chamber as indicated at 8. A portion of the remainder of the conductor 7 is housed in the conductor chamber 6 in the form of a coil 9, while the remaining portion of the free end of the conductor is extended up through the duct 5 and provided at its end with a suitable connecting terminal such as the bifurcated spade connector as indicated in dotted lines at 10. A portion of this free end of the conductor between the connector 10 and where it enters the recess 4 is bent over into the recess below the surface of the recess opening so as to leave a lifting portion 11 which may be readily taken hold of so as to withdraw the connector. For the purpose of protecting the conductor from dislodgment during handling of the battery, I fill the recess with a suitable frangible sealing material 12 preferably of an insulating quality such as paraffin wax or a soft form of insulating wax that may be easily broken to remove the conductor. Where desired this seal may be made to bear a suitable impression or marking which would have to be mutilated in order to remove the conductors for use, thus acting as a protection against unauthorized use of the battery.

In operation, when it is desired to connect the carbon element 2 with an element of another battery or any piece of apparatus, the seal 12 is broken, the free end 11 pulled up out of the recess, and the conductor 7 extended a suitable amount to afford the connection required, the required length of conductor being paid out from the coil 9 in the chamber 6. To prevent the conductor 7 from accidental electrical contact with other objects, when exposed, it is suitably insulated such as by a covering of the usual flexible insulating enamel. To aid the uninitiated in the use of the device, brief instructions may be indicated on the battery near the sealed terminal, as shown in the drawing.

In practice, generally, it would only be necessary to provide one of the elements, such as the carbon, with the attached flexible conductor, the other element being provided with the usual binding post or clip to receive the attached conductor of another battery, as such batteries usually have ample current capacity, for the work required by them, and simply have to be grouped in series connection to obtain whatever voltage is required.

It is most convenient to provide both battery elements with the attached flexible terminals and to this end I connect one end of a flexible conductor 13 to the zinc casing 3 of the battery as indicated at 14. This connection should of course be both a firm mechanical connection and a good electrical connection which may be effected in any well known manner as by soldering. I provide a housing for the flexible conductor 13 in the form of a recess 15 in the hard sealing compound 16 of the battery. The conductor 13 is nested in the recess 15 in the form of a coil as shown, and carries at its free end a suitable electrical coupling 17, a preferred form of which is that shown in Fig. 2 where the portion 18, of small diameter is the part which is permanently connected to the end of the flexible conductor as by soldering, and the portion 19 of larger diameter is made in the form of a scroll and knurled on the inside as at 20 so that it may be readily clamped onto the end of a conductor wire. The flexible conductor 13, after being placed in the housing as indicated, is also covered with a suitable soft or frangible insulating sealing compound to hold it in place and prevent its coming into electrical contact with other objects. The conductor 13 is also suitably insulated as by a covering of flexible enamel. When desired, the conductors may be made of resilient material so that the coiled portion will tend to act as a retractile spring to draw the conductor back into its housing in case of a break or disconnection.

While I have herein described and illustrated a preferred form of my invention, it is to be understood that I do not intend to be limited to such specific embodiment, but contemplate all such variations and modifications thereof as may fairly fall within the scope of the appended claims.

Having thus described my invention what I claim and desire to secure by Letters Patent is—

1. In a dry cell, a chambered carbon element therefor, a flexible conductor having one end fixed to the carbon in electrical contact therewith and the remainder removably inclosed within the chamber, and a frangible seal arranged to hold said conductor within the chamber.

2. In a dry cell, a chambered carbon element therefor, a flexible conductor having one end fixed to the carbon in electrical contact therewith and the remainder removably inclosed within the chamber, and a frangible seal of insulating material arranged to cover and hold said conductor within the recess.

3. In combination with a dry cell, a flexible conductor having one end permanently connected to one element of the cell, and the remainder folded into a recess wholly within the surfaces defining the battery proper, and a frangible seal of insulating material arranged to hold the conductor in the recess.

4. The combination with a dry cell, of a flexible conductor having one end mechanically and electrically connected with one element of the cell, and the remainder folded and attached to the cell by means of a frangible seal of insulating material, said conductor and seal being wholly within the surfaces defining the battery proper.

In testimony whereof I affix my signature.

STANLEY A. DUVALL.